US012716294B2

(12) United States Patent
Lei et al.

(10) Patent No.: US 12,716,294 B2
(45) Date of Patent: Aug. 25, 2026

(54) ROLLER SHUTTER DRIVING APPARATUS

(71) Applicant: LEAFY WINDOWARE CO., LTD., Dongguan City (CN)

(72) Inventors: Zhenbang Lei, Dongguan City (CN); Xingbang Lei, Dongguan City (CN)

(73) Assignee: LEAFY WINDOWARE CO., LTD., Dongguan City (CN)

( * ) Notice: Subject to any disclaimer, the term of this patent is extended or adjusted under 35 U.S.C. 154(b) by 0 days.

(21) Appl. No.: 19/486,005

(22) PCT Filed: Jun. 9, 2023

(86) PCT No.: PCT/CN2023/099445
§ 371 (c)(1),
(2) Date: Nov. 19, 2025

(87) PCT Pub. No.: WO2024/250284
PCT Pub. Date: Dec. 12, 2024

(65) Prior Publication Data
US 2026/0110216 A1 Apr. 23, 2026

(51) Int. Cl.
*E06B 9/171* (2006.01)
*E06B 9/68* (2006.01)

(52) U.S. Cl.
CPC ................ *E06B 9/68* (2013.01); *E06B 9/171* (2013.01)

(58) Field of Classification Search
CPC ..... E06B 9/68; E06B 9/72; E06B 9/60; E06B 9/17; E06B 9/171; E06B 2009/1746
See application file for complete search history.

(56) References Cited

U.S. PATENT DOCUMENTS 642,423 A * 1/1900 Brodie ...................... E06B 9/40 160/113
2,540,742 A * 2/1951 Langer ...................... E06B 9/60 160/317
5,117,893 A * 6/1992 Morrison .................. E06B 9/76 160/133
6,287,206 B1 * 9/2001 Stage ........................ F16D 3/38 464/119

(Continued)

FOREIGN PATENT DOCUMENTS

CN 107060625 A 8/2017
CN 206801431 U 12/2017

(Continued)

*Primary Examiner* — Johnnie A. Shablack

(57) ABSTRACT

A roller shutter driving apparatus includes a shaft fixed to a support frame outside one end of a roller shutter winding drum and inserted into and coaxially arranged with the winding drum, a driver arranged inside the winding drum for driving the winding drum to rotate about the shaft and including a base fixed relative to the winding drum in a circumferential direction and a rotating power member fixed to the base, and a two-stage universal joint arranged between the output shaft and the shaft and including a transmission shaft and two universal joint modules respectively set at opposite ends of the transmission shaft. Central axes of an output shaft of the rotating power member and the shaft are parallel to each other and have a preset non-zero spacing. External ends of the two universal joint modules are fixedly connected to the output shaft and the shaft in one-to-one correspondence.

11 Claims, 5 Drawing Sheets

(56) References Cited

U.S. PATENT DOCUMENTS

| | | | | |
|---|---|---|---|---|
| 6,672,363 | B2 * | 1/2004 | Schmidt | E06B 9/68<br>160/310 |
| 9,371,652 | B2 * | 6/2016 | Malott | E06B 9/76 |
| 9,903,157 | B2 * | 2/2018 | Dekker | E06B 9/322 |
| 11,866,994 | B2 * | 1/2024 | Francoeur | E06B 9/78 |
| 12,371,944 | B2 * | 7/2025 | Marchal | E06B 9/80 |
| 12,371,945 | B2 * | 7/2025 | Marchal | E06B 9/72 |
| 2019/0136617 | A1 * | 5/2019 | Kao | E06B 9/42 |
| 2019/0225059 | A1 | 7/2019 | Hiramatsu | |
| 2021/0363819 | A1 * | 11/2021 | Shopp | E06B 9/42 |

FOREIGN PATENT DOCUMENTS

| | | | |
|---|---|---|---|
| CN | 210396595 | U | 4/2020 |
| CN | 210564310 | U | 5/2020 |
| CN | 211397384 | U | 9/2020 |

* cited by examiner

ROLLER SHUTTER DRIVING APPARATUS

FIELD OF THE PRESENT INVENTION

The present invention relates to the technical field of curtain technology and, more particularly to a roller shutter driving apparatus.

BACKGROUND OF THE PRESENT INVENTION

Two ends of a current roller shutter winding drum are respectively installed on corresponding support frames, and a roller shutter driving device assembled inside the winding drum drives the winding drum to wind or unwind a curtain fabric. The current roller shutter driving device mainly includes a driver set inside the winding drum, a shaft fixed on the support frame at an outer side of one end of the winding drum and inserted into the winding drum, and a transmission mechanism for power transmission between the driver and the shaft. The driver includes a driving housing fixed relative to the winding drum and a rotating power member set inside the driving housing.

During specific implementation, an output shaft of the rotating power member is usually offset on one side of the driving housing and not coaxial with an axis of the winding drum, and the shaft usually extends into the winding drum from a middle of one end of the winding drum, resulting in misalignment between the output shaft and the shaft during specific assembly. The assembly difficulty of the transmission mechanism is high, and the current transmission mechanism usually uses a gear transmission mechanism, which also has relatively high noise during operation.

SUMMARY OF THE INVENTION

Technical Problem

Therefore, the technical problem to be solved by the embodiments of the present invention is to provide a roller shutter driving apparatus, which can effectively reduce assembly difficulty and avoid generating work noise.

Technical Solutions

To solve the above-mentioned technical problems, an embodiment of the present invention provides the following solutions. A roller shutter driving apparatus includes a shaft, a driver, and a two-stage universal joint; the shaft is fixed to a support frame that is fixed outside one end of a roller shutter winding drum, and inserted into and coaxially arranged with the winding drum; the driver is arranged inside the winding drum, for driving the winding drum to rotate about the shaft; the driver includes a base fixed relative to the winding drum in a circumferential direction, and a rotating power member fixed to the base; central axes of an output shaft of the rotating power member and the shaft are parallel to each other and have a preset non-zero spacing; the two-stage universal joint is arranged between the output shaft and the shaft, and includes a transmission shaft, and two universal joint modules respectively set at opposite ends of the transmission shaft; external ends of the two universal joint modules are fixedly connected to the output shaft of the rotating power member and the shaft in one-to-one correspondence.

Furthermore, each universal joint module includes a first fork arranged at a corresponding end of the transmission shaft and in a U-shape, a cross shaft, and an external shaft; the cross shaft has four short shafts with central axes located in a same plane and arranged in 90 degrees in rotation sequence; wherein one end of the external shaft is provided with a second fork in a U-shape, and the other end forms the corresponding external end, the cross shaft is rotatably connected to the first fork with two coaxial short shafts, and is rotatably connected to the second fork with the other two coaxial short shafts.

Furthermore, the second fork includes two fork arms located on opposite sides and parallel to each other, each fork arm correspondingly defines a shaft hole, for rotatable connection with a corresponding short shaft; an end of an inner side of each fork arm adjacent to a distal end of the fork arm is provided with an inclined guide surface, for guiding the corresponding short shaft of the cross shaft to slide between the two fork arms and insert into the shaft hole.

Furthermore, end surfaces of ends of the shaft and the output shaft respectively fixedly connected to the two-stage universal joint define sockets, for the corresponding external ends inserting into; the external ends and the corresponding sockets have non-circular cross-sections that are compatible with each other.

Furthermore, the two-stage universal joint further includes a housing that covers the transmission shaft and the universal joint, the two external ends extend out through predetermined through holes defined in opposite side walls of the housing.

Furthermore, the two-stage universal joint still further includes a limit bracket fixedly assembled inside the housing, for supporting the two external shafts and preventing axial movement of the external shafts; a sidewall of each external shaft located outside the corresponding socket defines a limit slot, the limit bracket includes a connecting arm, and two limit arms extending from opposite ends of the connecting arm and defining limit holes in distal ends; the limit holes of the two limit arms of the limit bracket are clamped in the limit slots of the two external shafts, and at least one limit arm defines a positioning hole; the housing is correspondingly provided with a positioning column, for being inserted into the positioning hole to position the limit bracket.

Furthermore, the roller shutter driving apparatus further includes a support bushing sleeved on an outer side of the shaft and fixed relative to the winding drum in the circumferential direction, wherein the housing is formed by interlocking a first half shell and a second half shell, and the first half shell is integrally formed with the support bushing.

Furthermore, the base is a driving housing that covers the rotating power member, the driving housing is docked with and fixedly connected to the second half shell, and a through hole is defined in a wall of an end of the driving housing that aligns with a distal end of the output shaft of the rotating power member inside the driving housing, for the corresponding external end to extend through to be fixed with the output shaft.

Furthermore, the rotating power member includes a planar spiral spring, and a spring winding frame for winding the planar spiral spring; axial directions of the spring winding frame and the output shaft are parallel, and an outer end of a spring plate of the planar spiral spring is fixed to a side of the output shaft.

Furthermore, the roller shutter driving apparatus provides at least two drivers linearly connected in sequence, a core shaft coaxially extends from the end of the output shaft of each driver away from the socket; the cross-sections of the core shaft and the corresponding socket are non-circular and compatible with each other, one of the drivers neighboring the two-stage universal joint is fixed by inserting the socket at the end of the output shaft with the external end of the external shaft, and the other drivers are fixed by inserting the sockets at the ends of their own output shafts with the core shafts on the other ends of the output shafts of the adjacent drivers close to the two-stage universal joint, to form a linear connection in sequence.

Beneficial Effects of the Invention

By adopting the above technical solution, embodiments of the present invention have at least the following beneficial effects. In the embodiment, the central axes of the output shaft and the shaft of the rotating power member are parallel to each other and set to have a preset non-zero spacing, which can effectively reduce the difficulty of assembly; furthermore, the two section universal joint is set between the output shaft and the shaft of the rotating power member; during specific assembly, the external ends of the two universal joint modules are fixedly connected to the output shaft and the shaft of the rotating power member, respectively, so that power transmission can be effectively achieved even when there is a non-coaxial relationship between the output shaft and the shaft; moreover, power transmission can be achieved without using gears, which also avoids the noise generated by the driving apparatus during operation.

DETAILED DESCRIPTION OF THE PRESENT INVENTION

Figure 1:
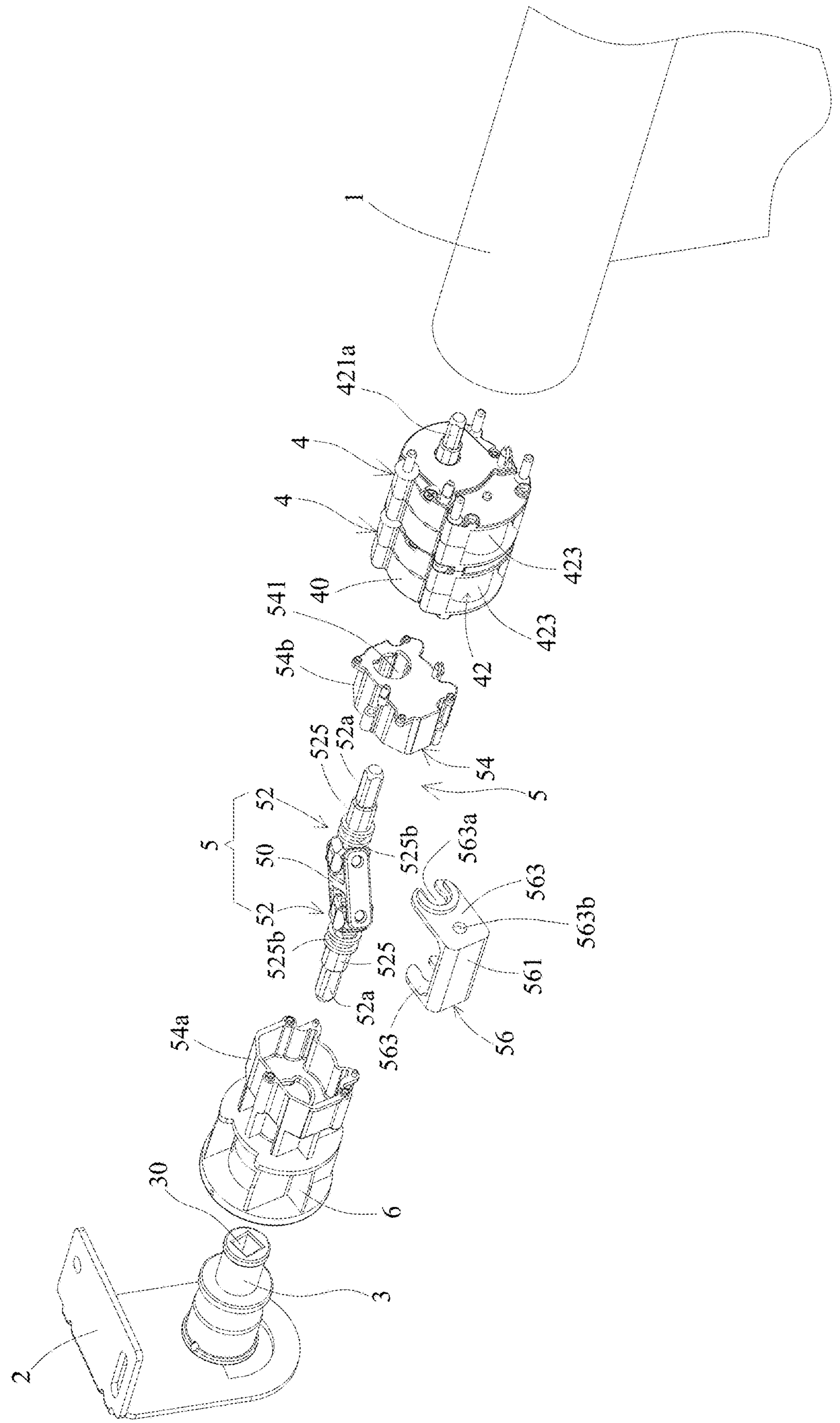
FIG. 1 is an exploded, isometric view of an embodiment of a roller shutter driving apparatus.

The present application will be further described in detail below with reference to the accompanying drawings and embodiments. It should be understood that the following illustrative embodiments and illustrations are only used to explain the present invention and are not intended to limit the present invention, and that the embodiments of the present invention and the features of the embodiments can be combined with each other without conflict.

Referring to FIGS. 1-4, the present embodiment provides a roller shutter driving apparatus, which includes a shaft 3 and a driver 4. The shaft 3 is fixed to a support frame 2 fixed outside one end of a winding drum 1 of a roller shutter, and is inserted into and coaxially arranged with the winding drum 1. The driver 4 is arranged inside the winding drum 1, for driving the winding drum 1 to rotate about the shaft 3. The driver 4 includes a base 40 fixed relative to the winding drum 1 in a circumferential direction and a rotating power member 42 fixed to the base 40. Central axes of an output shaft 421 of the rotating power member 42 and the shaft 3 are parallel to each other and have a preset non-zero spacing. The roller shutter driving apparatus further includes a two-stage universal joint 5 arranged between the output shaft 421 and the shaft 3. The two-stage universal joint 5 includes a transmission shaft 50, and two universal joint modules 52 respectively set at opposite ends of the transmission shaft 50. External ends **52*a* of the two universal joint modules 52 are fixedly connected to the output shaft 421 of the rotating power member 42 and the shaft 3** in one-to-one correspondence.

In the embodiment, the central axes of the output shaft 421 of the rotating power member 42 and the shaft 3 are parallel to each other and set to have a preset non-zero spacing, which can effectively reduce the difficulty of assembly. Furthermore, the two-stage universal joint 5 is set between the output shaft 421 of the rotating power member 42 and the shaft 3. During specific assembly, the external ends of the two universal joint modules 52 are fixedly connected to the output shaft 421 of the rotating power member 42 and the shaft 3, respectively, so that power transmission can be effectively achieved even in the presence of non-coaxial situations between the output shaft 421 and the shaft 3. Moreover, power transmission can be achieved without using gears, which also avoids the noise generated by the driving apparatus during operation.

Figure 2:
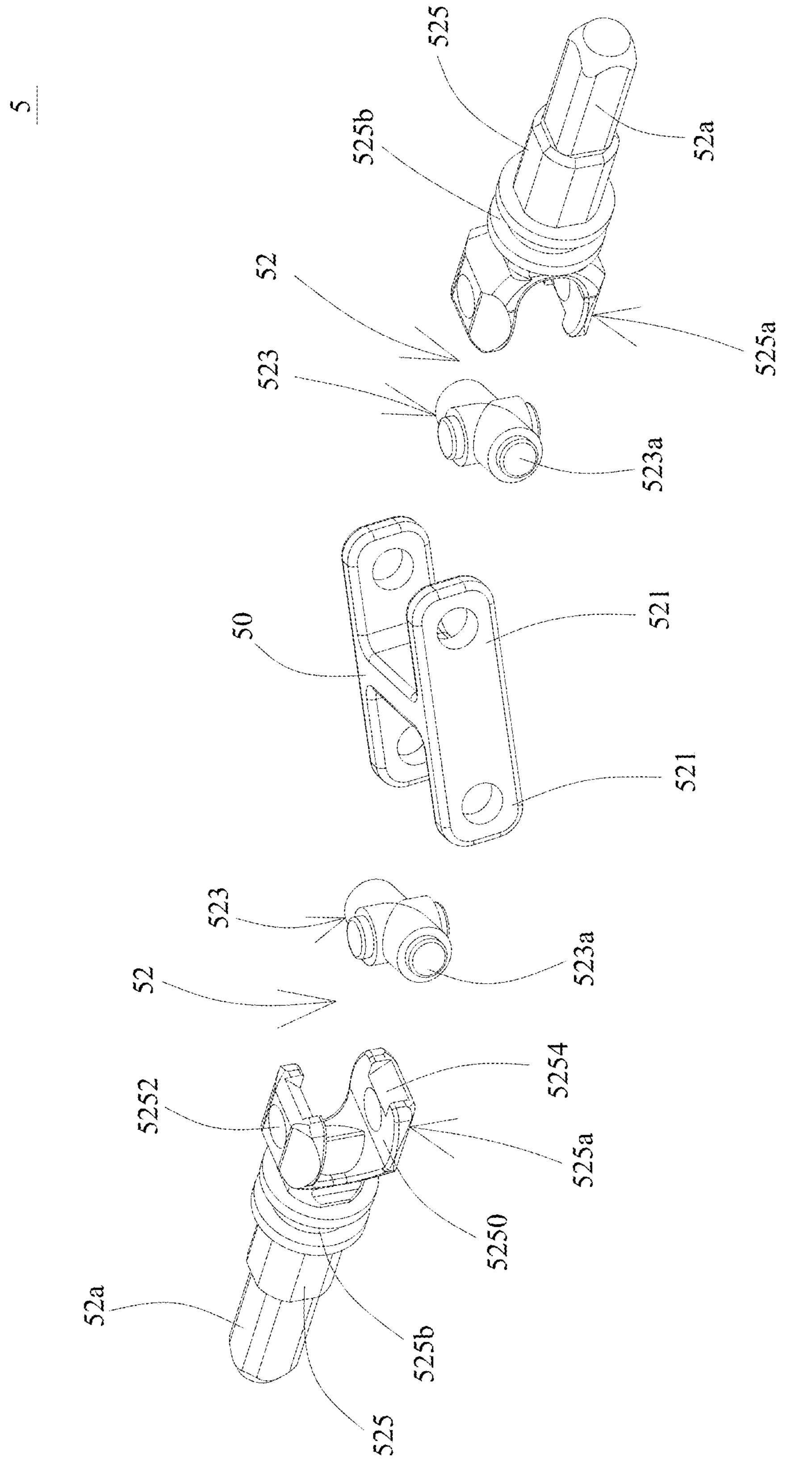
FIG. 2 is an exploded, isometric view of a two-stage universal joint of an embodiment of the roller shutter driving apparatus.
Figure 3:
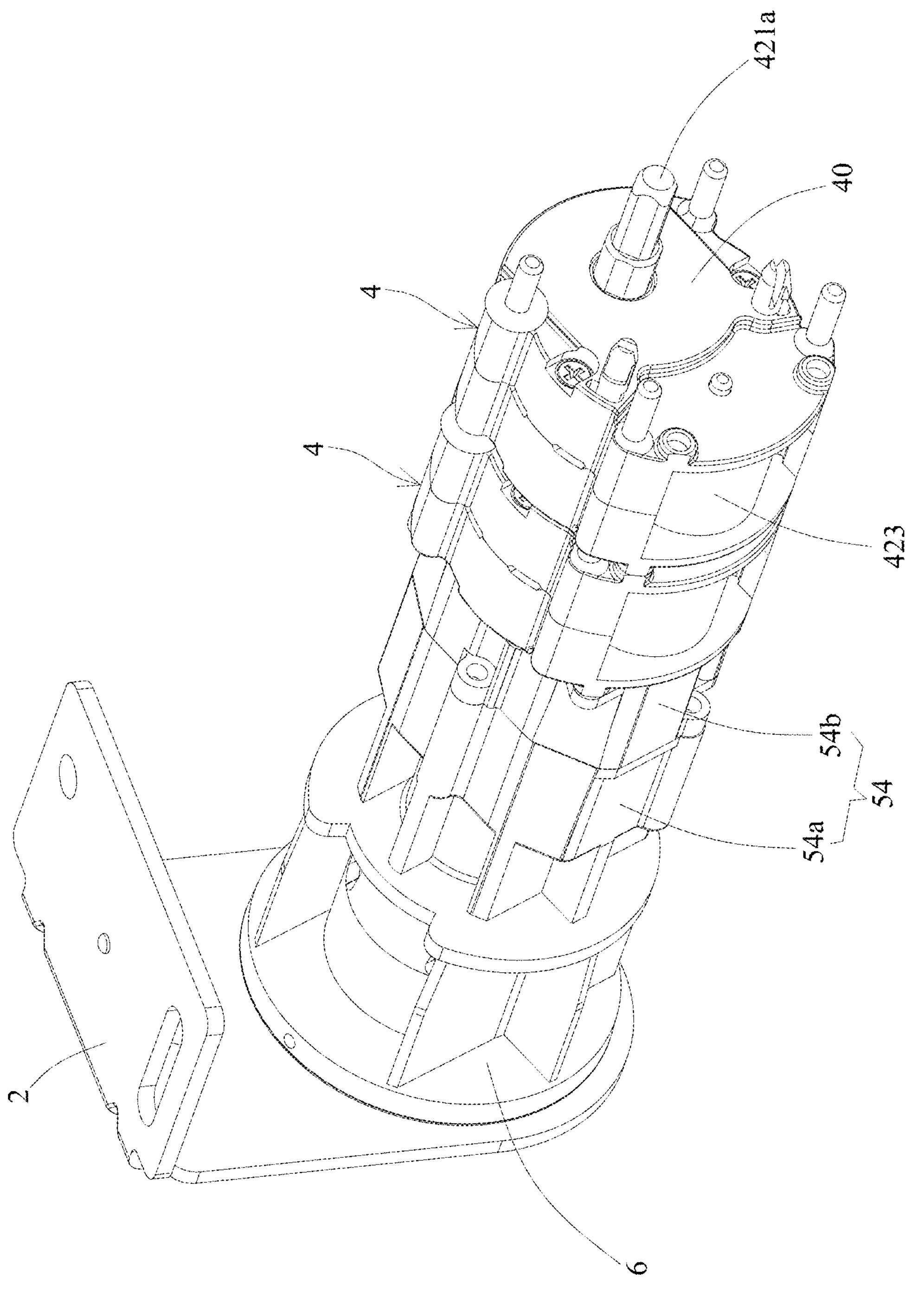
FIG. 3 is an assembled, isometric view of an embodiment of the roller shutter driving apparatus.
Figure 4:
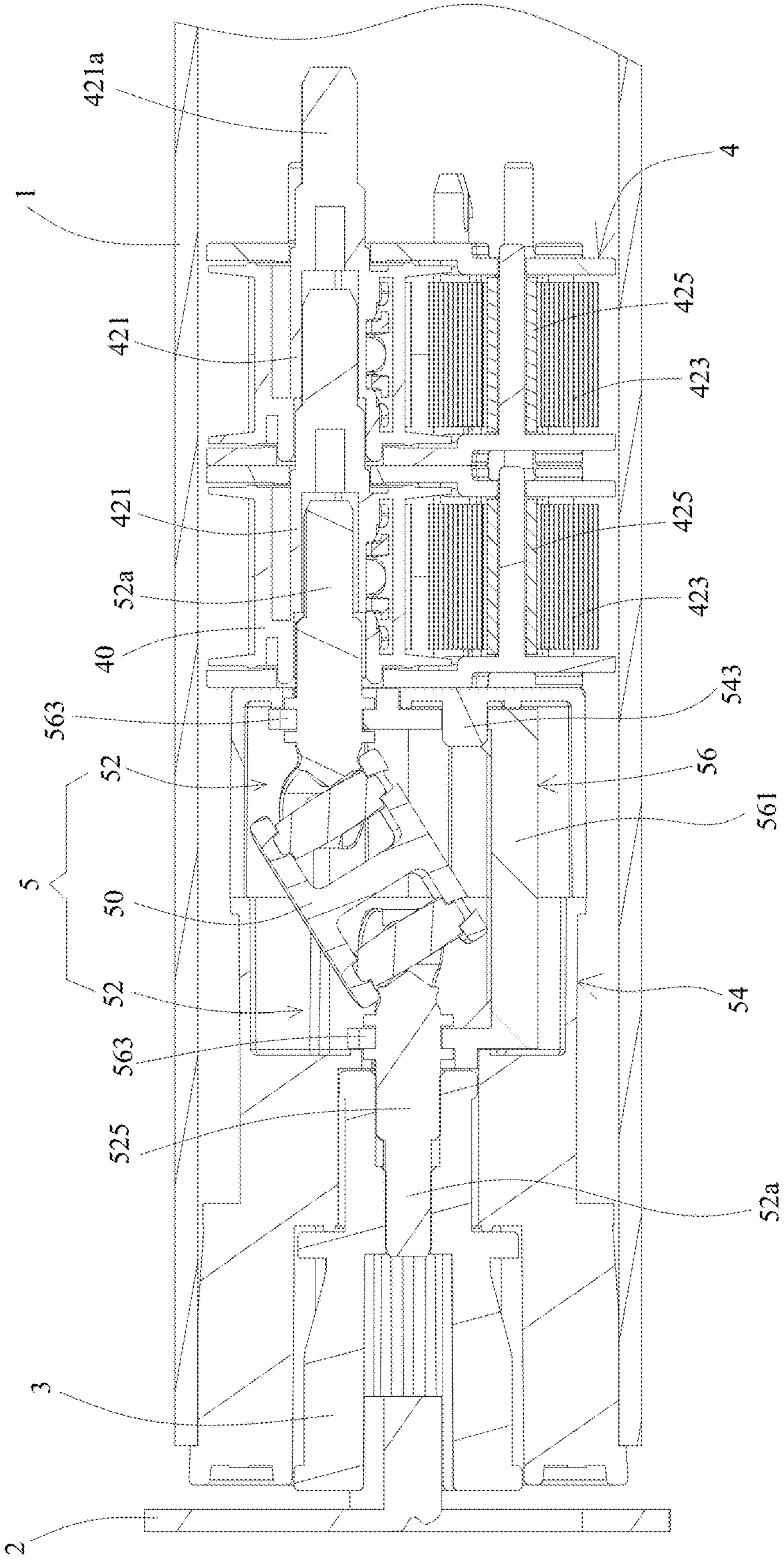
FIG. 4 is a cross-sectional view of an embodiment of the roller shutter driving apparatus.

In an embodiment, as shown in FIGS. 1, 2, and 4, each universal joint module 52 includes a first fork 521 arranged at a corresponding distal end of the transmission shaft 50 and in a U-shape, a cross shaft 523, and an external shaft 525. The cross shaft 523 has four short shafts **523*a* with central axes located in a same plane and arranged in 90 degrees in rotation sequence. One end of the external shaft 525 is provided with a second fork 525*a* in a U-shape, and the other end forms the external end 52*a*. The cross shaft 523 is rotatably connected to the first fork 521 with two coaxial short shafts 523*a*, and is rotatably connected to the second fork 525*a* with the other two coaxial short shafts 523*a*. In the embodiment, the universal joint module 52 has a specific structure including the first fork 521, the cross shaft 523, and the external shaft 525, whose structure is relatively simple, and forms a cross-shaft universal joint. The external shafts 525 are used to be fixed to the corresponding output shaft 421 and the shaft 3**, making assembly relatively convenient, with high transmission efficiency, easy manufacturing, and easy maintenance.

In an embodiment, as shown in FIG. 1, the second fork **525*a* includes two fork arms 5250 located on opposite sides and parallel to each other. Each fork arm 5250 correspondingly defines a shaft hole 5252, for rotatable connection with the short shaft 523*a*. An end of an inner side of each fork arm 5250 adjacent to a distal end of the fork arm 5250 is provided with an inclined guide surface 5254, for guiding the short shaft 523*a* of the cross shaft 523 to slide between the two fork arms 5250 and insert into the shaft hole 5252. In the embodiment, the shaft holes 5252 and the inclined guide surfaces 5254 are provided on the two fork arms 5250 of the second fork 525*a*, which facilitates the assembly of the short axes 523*a* of the cross shaft 523 with the second fork frame 525*a*** and improves assembly efficiency.

In an embodiment, as shown in FIGS. 1 and 2, end surfaces of ends of the shaft 3 and the output shaft 421 respectively fixedly connected to the two-stage universal joint 5 define sockets 30, for the corresponding external ends 52 inserting into. The external ends 52 and the corresponding sockets 30 have non-circular cross-sections that are compatible with each other. In the embodiment, by using the external ends **52*a* and the sockets 30 to be inserted and matched with each other, due to the non-circular cross-sections of the external ends 52***a* and the sockets 30 that are compatible with each other, the coaxial fixation of the external shaft 525 with the shaft 3 or the output shaft 421 can be achieved after the insertion is completed, and the assembly is very convenient. In specific implementation, the cross-sections of the external ends 52*a* and the sockets 30 can be in various shapes, such as regular polygons, rectangles, stars, or ellipses.

In an embodiment, as shown in FIGS. 1-4, the two-stage universal joint 5 further includes a housing 54 that covers the transmission shaft 50 and the universal joint 52. The two external ends 52*a* extend out through predetermined through holes 541 defined in opposite side walls of the housing 54. In the embodiment, the housing 54 is provided, which can accommodate structures such as the transmission shaft 50 and the universal joint 52 inside, optimize the overall structural layout, and effectively protect the transmission parts.

In an embodiment, as shown in FIGS. 1, 2, and 4, the two-stage universal joint 5 further includes a limit bracket 56 fixedly assembled inside the housing 54 for supporting the two external shafts 525 and preventing axial movement of the external shafts 525. A sidewall of each external shaft 525 located outside the socket 30 defines a limit slot 525*b*. The limit bracket 56 includes a connecting arm 561, and two limit arms 563 extending from opposite ends of the connecting arm 561 and defining limit holes 563*a* in their distal ends. Edges of the limit holes 563*a* of the two limit arms 563 of the limit bracket 56 are clamped in the limit slots 525*b* of the two external shafts 525, and at least one limit arm 563 defines a positioning hole 563*b*. The housing 54 is correspondingly provided with a positioning column 543 for being inserted into the positioning hole 563*b* to position the limit bracket 56. When the overall driving apparatus is transported and assembled, it is inevitable to place the driving apparatus vertically. At this time, due to the fact that the external ends 52*a* of the external shafts 525 are only inserted into the sockets 30 of the output shaft 421 and the shaft 3, the external ends 52*a* are prone to fall out of the sockets 30 under the action of gravity. Therefore, in the embodiment, the limit bracket 56 is also provided, and the edges of the limit holes 563*a* of the two limit arms 563 of the limit bracket 56 are clamped in the limit slots 525*b* of the two external shafts 525, so as to limit the external shafts 525 in the axial direction and prevent the two external shafts 525 from disengaging from the corresponding sockets 30. Moreover, as shown in FIGS. 1, 2, and 4, by using the insertion and coordination of the positioning hole 563*b* in the limit arm 563 and the positioning column 543 on the housing 54, the assembly and positioning of the limit bracket 56 can be effectively achieved, making disassembly and assembly convenient.

In an embodiment, as shown in FIGS. 1-4, the roller shutter driving apparatus further includes a support bushing 6 sleeved on an outer side of the shaft 3 and fixed relative to the winding drum 1 in the circumferential direction. The housing 54 is formed by interlocking a first half shell 54*a* and a second half shell 54*b*, and the first half shell 54*a* is also integrally formed with the support bushing 6. In the embodiment, the support sleeve 6 is also provided, which can effectively support the winding drum 3 at the distal end of the winding drum 3 and achieve its smooth rotation. In addition, the housing 54 is formed by interlocking the first half shell 54*a* and the second half shell 54*b*, and the first half shell 54*a* is integrally formed with the support bushing 6, making disassembly and assembly very convenient.

In an embodiment, as shown in FIGS. 1-5, the base 40 is a driving housing 40 that covers the rotating power member 42. The driving housing 40 is docked with and fixedly connected to the second half shell 54*b*, and a through hole 401 is defined in a wall of an end of the driving housing 40 that aligns with a distal end of the output shaft 421 of the rotating power member 42 inside the driving housing 40, for the external end 52*a* to extend through to be fixed with the output shaft 421. In the embodiment, the base 40 adopts a housing, which can effectively cover the rotating power member 42, achieve protection, and facilitate the docking of the output shaft 421 of the rotating power member 42 with the external end 52*a*.

Figure 5:
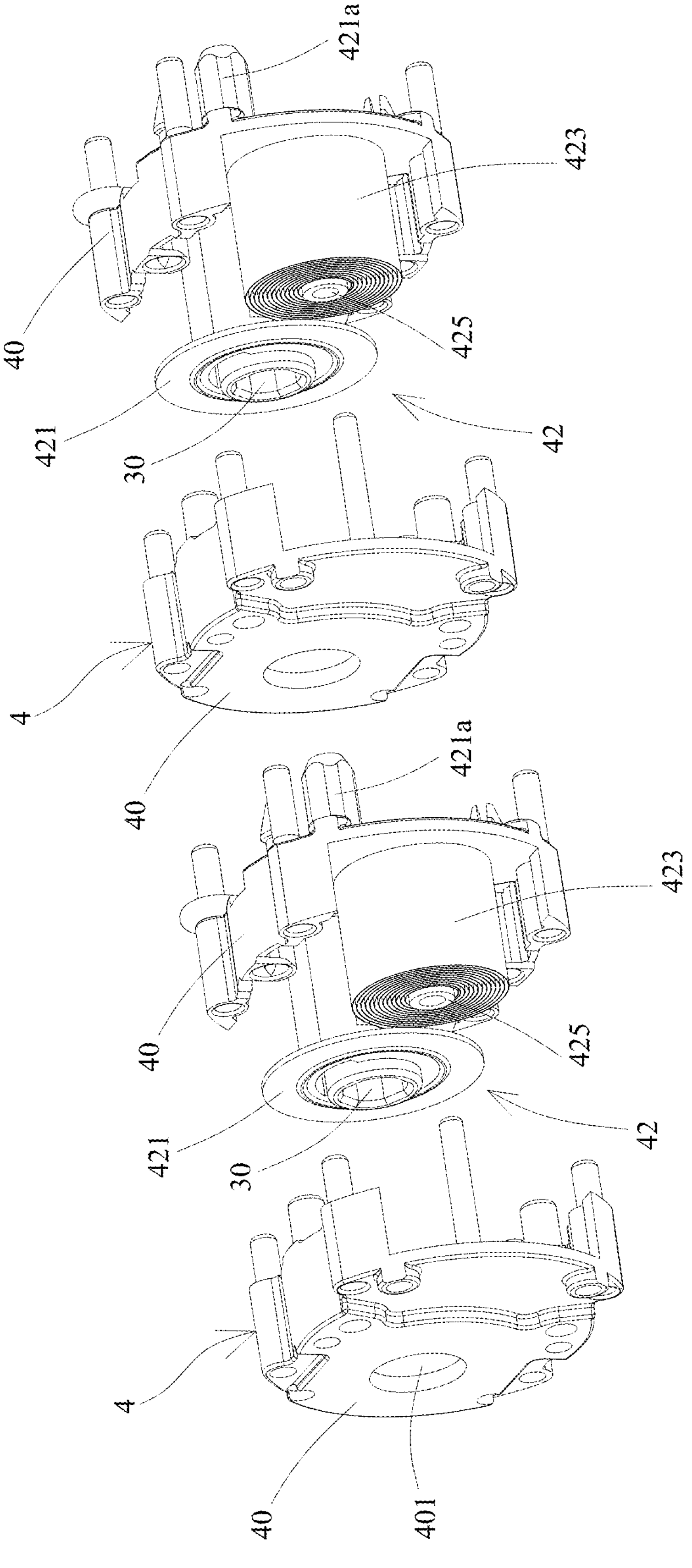
FIG. 5 is an exploded, isometric view of two linearly connected drivers of an embodiment of the roller shutter driving apparatus.

In an embodiment, as shown in FIGS. 4-5, the rotating power member 42 further includes a planar spiral spring 423 and a spring winding frame 425 for winding the planar spiral spring 423. The axial directions of the spring winding frame 425 and the output shaft 421 are parallel, and an outer end of a spring plate of the planar spiral spring 423 is fixed to a side of the output shaft 421. The embodiment uses the spring winding frame 425 and the output shaft 421 being arranged parallel to each other in the axial directions, and the planar spiral spring 423 is used as a power member to drive the output shaft 421 to rotate. The installation is convenient, and the controllability of the driving force provided is strong, which can better design the driving force required for the winding or unwinding a shutter body. The overall structure is simple, easy to assemble, and easy to operate.

In an embodiment, as shown in FIGS. 1, 4, and 5, the roller shutter driving apparatus is provided with at least two drivers 4 linearly connected in sequence. A core shaft 421*a* coaxially extends from the end of the output shaft 421 of each driver 4 away from the socket 30. The cross-sections of the core shaft 421*a* and the socket 30 are also non-circular and compatible with each other. One of the drivers 4 neighboring the two-stage universal joint 5 is fixed by inserting the socket 30 at the end of the output shaft 421 with the external end 52*a* of the external shaft 525, and the other drivers 4 are fixed by inserting the sockets 30 at the ends of their own output shafts 421 with the core shafts 421*a* on the other ends of the output shafts 421 of the adjacent drivers 4 close to the two-stage universal joint 5, to form a linear connection in sequence. The embodiment connects the at least two drivers 4 in series through the output shafts 421 to form a driver combination. The output shafts 421 of the at least two drivers 4 are connected through the sockets 30 and the core shafts 421*a* to output power as a whole. The structure is very simple and can flexibly adjust the output power provided by the roller shutter driving apparatus of this application.

The embodiments of the present invention have been described above with reference to the accompanying drawings, but the present invention is not limited to the specific implementations described above, and the specific implementations described above are only schematic and not limiting. Under the enlightenment of this invention, many forms can be made without departing from the scope of this invention and the scope of protection of the claims, and these are all included in the scope of protection of this invention.

What is claimed is:

1. A roller shutter driving apparatus, comprising:

a shaft fixed to a support frame that is fixed outside one end of a roller shutter winding drum, and inserted into and coaxially arranged with the winding drum;

a driver arranged inside the winding drum, for driving the winding drum to rotate about the shaft, wherein the driver comprises a base fixed relative to the winding drum in a circumferential direction, and a rotating power member fixed to the base; central axes of an output shaft of the rotating power member and the shaft are parallel to each other and have a preset non-zero spacing; and a two-stage universal joint arranged between the output shaft and the shaft, wherein the two-stage universal joint comprises a transmission shaft, and two universal joint modules respectively set at opposite ends of the transmission shaft; external ends of the two universal joint modules are fixedly connected to the output shaft of the rotating power member and the shaft in one-to-one correspondence.

2. The roller shutter driving apparatus of claim 1, wherein the rotating power member comprises a planar spiral spring, and a spring winding frame for winding the planar spiral spring; axial directions of the spring winding frame and the output shaft are parallel, and an outer end of a spring plate of the planar spiral spring is fixed to a side of the output shaft.

3. The roller shutter driving apparatus of claim 1, wherein each universal joint module comprises a first fork arranged at a corresponding end of the transmission shaft and in a U-shape, a cross shaft, and an external shaft; the cross shaft has four short shafts with central axes located in a same plane and arranged in 90 degrees in rotation sequence; wherein one end of the external shaft is provided with a second fork in a U-shape, and the other end forms the corresponding external end, the cross shaft is rotatably connected to the first fork with two coaxial short shafts, and is rotatably connected to the second fork with the other two coaxial short shafts.

4. The roller shutter driving apparatus of claim 3, wherein the second fork comprises two fork arms located on opposite sides and parallel to each other, each fork arm correspondingly defines a shaft hole, for rotatable connection with a corresponding short shaft; an end of an inner side of each fork arm adjacent to a distal end of the fork arm is provided with an inclined guide surface, for guiding the corresponding short shaft of the cross shaft to slide between the two fork arms and insert into the shaft hole.

5. The roller shutter driving apparatus of claim 3, wherein end surfaces of ends of the shaft and the output shaft respectively fixedly connected to the two-stage universal joint define sockets, for the corresponding external ends inserting into; the external ends and the corresponding sockets have non-circular cross-sections that are compatible with each other.

6. The roller shutter driving apparatus of claim 5, wherein the two-stage universal joint further comprises a housing that covers the transmission shaft and the universal joint, the two external ends extend out through predetermined through holes defined in opposite side walls of the housing.

7. The roller shutter driving apparatus of claim 6, wherein the two-stage universal joint still further comprises a limit bracket fixedly assembled inside the housing, for supporting the two external shafts and preventing axial movement of the external shafts; a sidewall of each external shaft located outside the corresponding socket defines a limit slot, the limit bracket comprises a connecting arm, and two limit arms extending from opposite ends of the connecting arm and defining limit holes in distal ends; the limit holes of the two limit arms of the limit bracket are clamped in the limit slots of the two external shafts, and at least one limit arm defines a positioning hole; the housing is correspondingly provided with a positioning column, for being inserted into the positioning hole to position the limit bracket.

8. The roller shutter driving apparatus of claim 6, further comprising a support bushing sleeved on an outer side of the shaft and fixed relative to the winding drum in the circumferential direction, wherein the housing is formed by interlocking a first half shell and a second half shell, and the first half shell is integrally formed with the support bushing.

9. The roller shutter driving apparatus of claim 8, wherein the base is a driving housing that covers the rotating power member, the driving housing is docked with and fixedly connected to the second half shell, and a through hole is defined in a wall of an end of the driving housing that aligns with a distal end of the output shaft of the rotating power member inside the driving housing, for the corresponding external end to extend through to be fixed with the output shaft.

10. The roller shutter driving apparatus of claim 9, wherein the rotating power member comprises a planar spiral spring, and a spring winding frame for winding the planar spiral spring; axial directions of the spring winding frame and the output shaft are parallel, and an outer end of a spring plate of the planar spiral spring is fixed to a side of the output shaft.

11. The roller shutter driving apparatus of claim 5, wherein the roller shutter driving apparatus provides at least two drivers linearly connected in sequence, a core shaft coaxially extends from the end of the output shaft of each driver away from the socket; the cross-sections of the core shaft and the corresponding socket are non-circular and compatible with each other, one of the drivers neighboring the two-stage universal joint is fixed by inserting the socket at the end of the output shaft with the external end of the external shaft, and the other drivers are fixed by inserting the sockets at the ends of their own output shafts with the core shafts on the other ends of the output shafts of the adjacent drivers close to the two-stage universal joint, to form a linear connection in sequence.

* * * * *